Sept. 30, 1969  D. S. GULLICK  3,469,853
SEALING DEVICES
Filed Dec. 28, 1966

INVENTOR
DENZIL S. GULLICK
BY
Christensen, Sanborn & Matthews
ATTORNEYS.

United States Patent Office 3,469,853
Patented Sept. 30, 1969

3,469,853
SEALING DEVICES
Denzil S. Gullick, Shurdington, Cheltenham, Gloucester, England, assignor to Dowty Rotol Limited, Gloucester, England, a British company
Filed Dec. 28, 1966, Ser. No. 605,318
Claims priority, application Great Britain, Dec. 30, 1965, 55,285/65
Int. Cl. F16j 15/16, 15/56
U.S. Cl. 277—112                     5 Claims

ABSTRACT OF THE DISCLOSURE

A sealing device for use at very high fluid pressures, for example, for sealing the piston and cylinder members of a liquid spring, comprises a housing in one of the members having an annular recess which receives a ring assembly including a first sealing ring, a second sealing ring of tougher material and an anti-extrusion ring slidably engaging the other of the members, and a loading ring of material more flexible than that of the first sealing ring filling the remaining space between the base of the recess and the ring assembly, a substantially rigid movable ring slidably engaging both the base of the recess and the said other of the members, and a spring acting against the movable ring to compress the loading ring.

---

This invention relates to sealing devices for use between a cylinder member and a piston member slidable therein. The invention is moreover suitable for sealing the relatively movable members of devices which operate at very high fluid pressures, such as liquid springs.

In a known sealing device suitable for a liquid spring, the packing is loaded by a fluid-pressure-actuated member of differential area whereby a pressure is induced in the packing which is proportionately greater than that in the fluid. Thus at the very high pressures which can be developed in a liquid spring, the excess of pressure in the packing over the pressure of the liquid may be considerably higher than that which is necessary to maintain a seal. If, on the other hand, the fluid pressure falls to zero there may be insufficient pressure of the packing to establish an initial seal, particularly if the packing is worn.

According to the present invention a sealing device for use between a cylinder member and a piston member slidable therein comprises an annular recess formed in a first one of said members by a cylindrical wall which is spaced from a cylindrical surface of the second of said members, by a fixed wall closing one end of the recess, and by a substantially rigid movable ring having sliding engagement with the cylindrical wall of the first member and with the cylindrical surface of the second member at the other end of the recess, the movable ring being urged towards the fixed wall by the pressure of fluid which is to be sealed by the device, a ring assembly disposed in the recess and engaging said cylindrical surface, said ring assembly including a first sealing ring of flexible material adjacent the movable ring, an anti-extrusion ring adjacent the fixed wall, and a second sealing ring of tougher material than that of the first sealing ring disposed axially between the first sealing ring and the anti-extrusion ring, said second sealing ring having an axial length which is less than that of the first sealing ring, a loading ring of material more flexible than the sealing material axially disposed between the fixed wall and the movable ring, and radially disposed between the cylindrical wall and said ring assembly, and spring means acting against the movable ring to compress the loading ring whereby, in the absence of pressure in the fluid to be sealed, the loading ring causes the sealing ring to exert an initial sealing pressure against the cylindrical surface of the second member.

In the sealing device of the present invention, the spring means causes a pre-load which establishes an initial seal at zero fluid pressure and this pre-load forms an excess pressure which is maintained substantially constant as fluid pressure increases.

Figure 1:
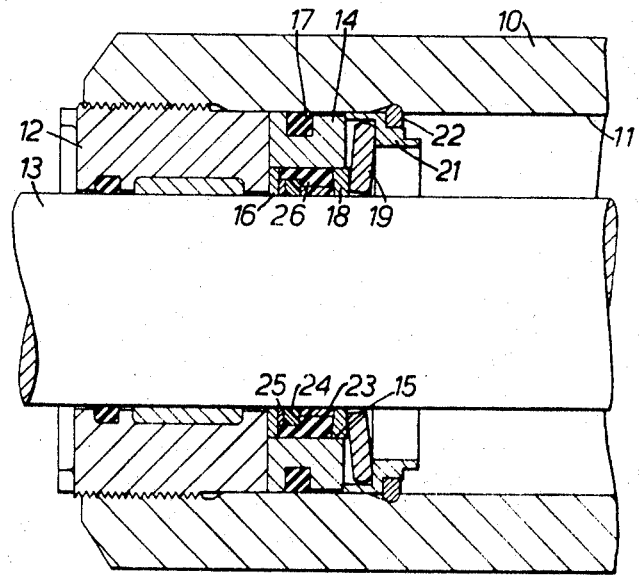
Figure 2:
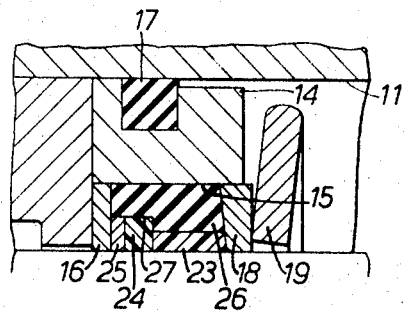

Part of a piston and cylinder device is shown in section in FIGURE 1 of the accompanying drawings, while FIGURE 2 is a detail of FIGURE 1 on an enlarged scale.

The fluid pressure device has a cylinder 10 with a bore 11 which is closed at one end by a screw plug 12. A piston member has a cylindrically-surfaced shaft 13 extending slidably through the screw plug. The plug 12 retains a housing ring 14 having a seal 17 which engages the bore 11. The housing ring 14 has a bore 15 which forms the base of an annular recess for receiving a packing. One end of the recess is closed by a fixed wall 16 formed by a metal backing ring which is seated against the inner end of the plug 12. A substantially rigid metal ring 18 slidably engaging the bore 15 and the shaft 13 at the other end of the recess, forms a movable end wall which is resiliently urged towards the fixed wall 16 by a spring 19. This spring has the form of a Belleville washer whose outer edge is retained by a spacer ring 21 which lies between the housing ring 14 and a spring circlip 22 which is located by a groove in the bore 11.

The spring 19 provides a pre-load on a packing which is housed in the recess. The packing consists of an assembly of rings. A first sealing ring 23 around the shaft 13 and located behind the metal ring 18 is formed of low friction material such as polytetrafluoroethylene. Behind this is a second sealing ring 24 of a tougher material such as nylon, while between this ring 24 and the fixed wall 16 is an anti-extrusion ring 25 of sintered metal capable of retaining a lubricant. The axial length of the ring 24 is less than that of the ring 23 but its radial thickness is greater. The rings 23, 24 and 25 lie spaced from the base of the recess, and the remaining space is filled with a loading ring 26 of synthetic rubber which is more flexible than the sealing rings.

The face of the metal ring 18 which engages the loading ring 26 and the sealing ring 23 is frusto-conical with a large apex angle, the ring 18 having a greater thickness at its outside diameter. The sealing ring 23 has a generally rectangular cross-section, which is greater in its axial dimension. The nylon sealing ring 24 and the anti-extrusion ring 25 have an external diameter greater than that of the sealing ring 23, and they fit a rectangular rebate 27 formed in the loading ring 26.

The Belleville washer 19, occupying the larger part of the radial dimension between the cylinder 10 and the shaft 13, exerts a substantial axial load on the metal ring 18 whereby the compression of the loading ring 26 causes the sealing rings 23 and 24 to exert an initial sealing pressure against the shaft 13 which provides a fluid tight seal even if there is no fluid pressure within the cylinder. When there is fluid pressure, this acts over the annular area of the metal ring 18 between the shaft 13 and the bore 15 to produce a sealing pressure on the rings 23, 24 which is proportional to fluid pressure. To this is added the constant load caused by the Belleville washer.

The anti-extrusion ring 25 is also subjected to radial compression load by the loading ring 26, and being to some extent yieldable, it will bear with increased pressure against the shaft 13 as the fluid pressure is increased.

While the embodiment described above shows a seal established against a piston rod or shaft, the arrangement may be reversed to provide a seal carried by a piston and operating against a cylinder bore.

I claim as my invention:

1. In combination, a cylinder member (10), a piston member (13) slidable therein, and a device interposed between the members for sealing against a fluid pressure acting thereon, comprising
   (A) a housing (14) in a first one (10) of said members having an annular recess formed by
      (1) a cylindrical wall (15) which is radially spaced from a cylindrical surface of the second (13) of said members, and by
      (2) a fixed wall (16) closing one end of the recess,
   (B) a substantially rigid ring (18) radially interposed across the other end of the recess in sliding engagement with each of the cylindrical wall and the cylindrical surface, so as to movably close the other end,
   (C) a ring assembly axially interposed in the recess between the fixed wall and the movable ring, and engaging said cylindrical surface, said ring assembly including
      (1) a first sealing ring (23) of a flexible material adjacent the movable ring (18)
      (2) an anti-extrusion ring (25) adjacent the fixed wall, and
      (3) a second sealing ring (24) of a tougher material than that of the first sealing ring (23) axially interposed between the first sealing ring (23) and the anti-extrusion ring (25), said second sealing ring (24) having an axial length which is less than that of the first sealing ring (23),
   (D) a loading ring (26) of material more flexible than that of the first sealing ring (23) axially interposed between the fixed wall (16) and the movable ring (18), and radially interposed between the cylindrical wall (15) and said ring assembly, and
   (E) spring means acting against the movable ring (18) to compress the loading ring (26), the compression being increased by the action of the fluid pressure on the movable ring (18).

2. A sealing device according to claim 1, wherein the second sealing ring (24) has a thickness in the radial direction which is greater than that of the first sealing ring (23).

3. A sealing device according to claim 2, wherein the thickness of the anti-extrusion ring (25) in the radial direction is substantially equal to that of the second sealing ring (24).

4. A sealing device according to claim 1, wherein the fixed wall (16) is formed as separate ring which fits the cylindrical wall (15) and which together with the housing (14) is retained in the first one (10) of said members by a plug (12).

5. The sealing device according to claim 1 wherein the movable ring (18) extends the full radial width of the recess from the cylindrical wall to the cylindrical surface, and vice versa, around the entire perimeter thereof.

References Cited

UNITED STATES PATENTS

| | | | |
|---|---|---|---|
| 2,567,527 | 9/1951 | Parks | 277—110 |
| 2,711,333 | 6/1955 | Rodgers | 277—105 XR |
| 3,071,386 | 1/1963 | Scannell | 277—188 XR |
| 3,144,254 | 8/1964 | Krizman | 277—111 |
| 3,146,683 | 9/1964 | Hoffmans | 277—188 XR |
| 3,261,613 | 7/1966 | Norick et al. | 277—188 XR |
| 3,381,970 | 5/1968 | Brown | 277—188 XR |

FOREIGN PATENTS 710,374 6/1954 Great Britain.

SAMUEL ROTHBERG, Primary Examiner

U.S. Cl. X.R.

277—165, 188